United States Patent [19]

Newsom

[11] Patent Number: 5,454,960
[45] Date of Patent: Oct. 3, 1995

[54] OIL CHANGE AND RECYCLING SYSTEM

[75] Inventor: Bob G. Newsom, Virgie, Ky.

[73] Assignee: Advanced Building Technologies, Inc., Olive Hill, Ky.

[21] Appl. No.: 149,904

[22] Filed: Nov. 10, 1993

[51] Int. Cl.[6] .................................................. B01D 37/00
[52] U.S. Cl. ................... 210/805; 123/196 A; 137/312; 141/86; 184/1.5; 184/106; 210/248
[58] Field of Search ..................... 210/171, 235, 210/248, 767, 805; 123/196 A; 137/312; 141/86; 184/1.5, 106; 220/573; 222/108

[56] References Cited

U.S. PATENT DOCUMENTS

| | | | |
|---|---|---|---|
| 3,908,797 | 9/1975 | Schnepp | 184/1.5 |
| 4,296,838 | 10/1981 | Cohen | 184/1.5 |
| 4,524,866 | 6/1985 | Pollacco | 184/1.5 |
| 4,865,156 | 9/1989 | Poling | 184/1.5 |
| 4,913,813 | 4/1990 | Covarrubias et al. | 210/248 |
| 4,929,356 | 5/1990 | Todd | 210/248 |
| 4,930,602 | 6/1990 | Gust | 184/1.5 |
| 5,092,457 | 3/1992 | Islava et al. | 184/106 |

*Primary Examiner*—Joseph W. Drodge
*Attorney, Agent, or Firm*—Harold Gell

[57] ABSTRACT

An oil recycling system and method which uses the same container to supply new oil and recycle old oil is accomplished through the use of a transfer tube designed for draining oil from the container into an engine and mutually exclusively oil from the engine oil sump into the container. The invention includes an oil collection bag which receives oil draining from an interface between the engine and an oil filter and transfers the oil via an oil collection bag tube into the container concurrently with oil draining from the engine via the transfer tube into the container.

14 Claims, 9 Drawing Sheets

OIL CHANGE AND RECYCLING SYSTEM

TECHNICAL FIELD

The present invention relates to a method and apparatus for supplying new and collecting used oil from a machine such as an internal combustion engine.

BACKGROUND OF THE INVENTION

With the increasing awareness of the fragile nature of our planet and its limited resources, it has become imperative that non-renewable resources such as oil be recycled. This is currently being accomplished by employing a number of different devices which are generally borrowed from other technologies and combined in a haphazard inefficient fashion. This leads to waste of the oil as well as the supply and collecting devices.

One problem with the aggregation of devices used to collect spent oil from an engine is that it usually consists of a drain pan which is positioned under the oil sump drain. Such systems have a number of inherent problems which include uncollectible oil adhering to the collection pan and oil leaking from the oil filter area that is not collected.

OBJECTIVES OF THE INVENTION

It is a primary objective of the present invention to provide a method and apparatus which minimizes waste and promotes recycling of fossil oils.

Another objective of the present invention is to provide a container for supplying fresh oil to an engine and returning spent oil for reprocessing.

A further objective is to provide a leak-proof coupling means between an oil sump drain and a collection container.

A still further objective of the invention is to provide a means for collecting spent oil from the oil filter area of an engine simultaneously with oil from the oil sump.

Another objective of the invention is to provide a container for fresh oil which incorporates two closeable openings which are used to receive spent oil from the engine sump and oil filter for recycling.

Another objective of the present invention is to provide an apparatus for collecting spent oil leaking from a loosened oil filter in a container which is simultaneously receiving spent oil from the oil sump.

SUMMARY OF THE INVENTION

The present invention is comprised of supply/collection containers which include two closeable openings and are configured to permit interlocking stacking. Either opening may be used to transfer oil to and from an engine via a transfer tube. The transfer tube is provided with a means for completing a leak-proof coupling at each end. One coupling mates with one of the closeable openings of a container and the other coupling, at the other end of the tube, fits within the oil filler pipe when adding oil from the container to an engine or mates with the oil sump drain when draining oil from the engine. An oil filter drain comprised of a plastic bag which has a pair of stretchable handles dimensioned to slip over an oil filter installed on an engine is provided with a drain tube as an extension of the bag bottom. This tube fits within one of the container openings. When the oil filter drain is properly installed, the oil filter may be loosened and leaking oil is collected in the bag and directed via the drain tube to the container. Both tubes are dimensioned to fit within separate closeable openings in the container and may be provided with screw top adaptations to ensure that the tubes do not inadvertently come out during the oil draining process.

DETAILED DESCRIPTION OF THE INVENTION

Figure 1:
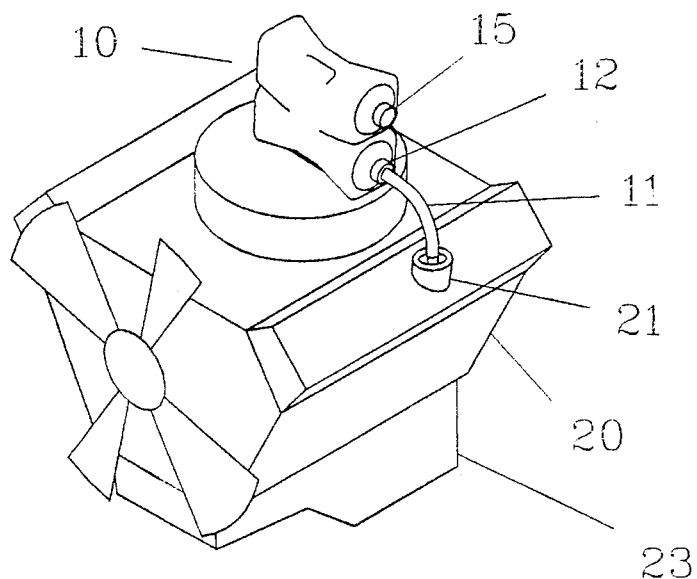
FIG. 1 illustrates a typical internal combustion engine being supplied with fresh oil.

FIG. 1 illustrates the supply/recycling container 10 positioned on top of a conventional internal combustion engine 20. Fresh oil is drained from the container via the transfer tube 11 into the oil fill opening 21 of the engine. The transfer tube 11 is connected to container 10 by a threaded adapter fitting 12 which secures a flow controlling conduit designed to replace the normal screw top cap of one of the openings of the container 10.

The shape of the recycling container 10 provides a flat side configured to allow the container to rest on the top of the engine 20 as illustrated in FIG. 1 to facilitate draining the fresh oil from the container into the engine. Once the oil has been drained from the container, the container is saved for collecting and recycling spent oil at the next oil change.

Figure 2:
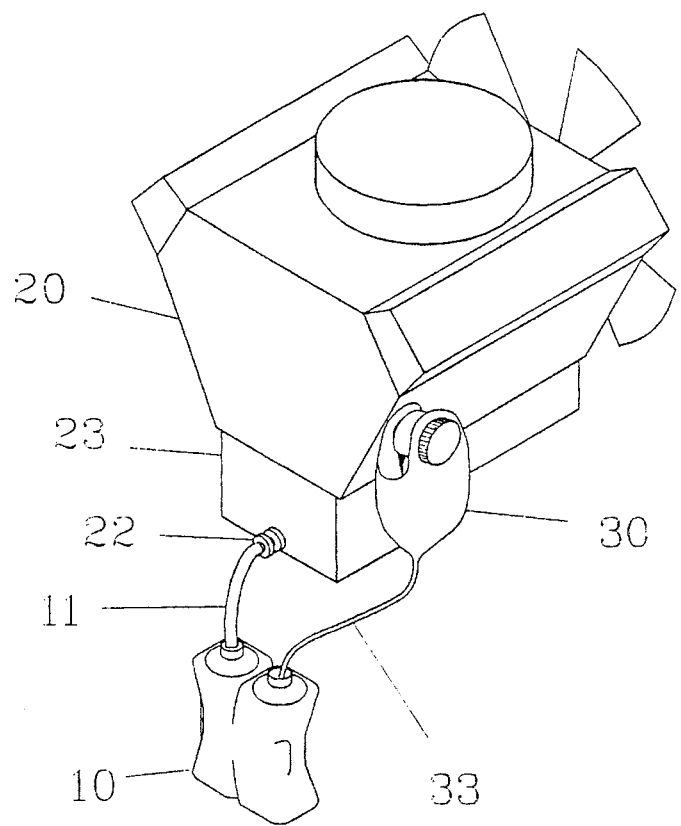
FIG. 2 is a perspective view of a stylized engine illustrating the oil supply/recycling container and associated tubes as they are deployed during oil collection operations.

FIG. 2 illustrates the supply/recycling container 10 as it is employed to reclaim spent oil during an oil change. The transfer tube 11 is connected via the threaded cap adapter fitting 12 to one opening of the container as used during the operation illustrated in FIG. 1 where fresh oil is added to the engine. In the reclaiming process, the other end of the transfer tube 11 is connected to the sump drain opening 22 on the oil pan or sump 23 of the engine 20 and the oil filter drain tube 33 at the bottom of the oil filter drip collection bag 30 is placed in the second opening of the container.

Figure 3:
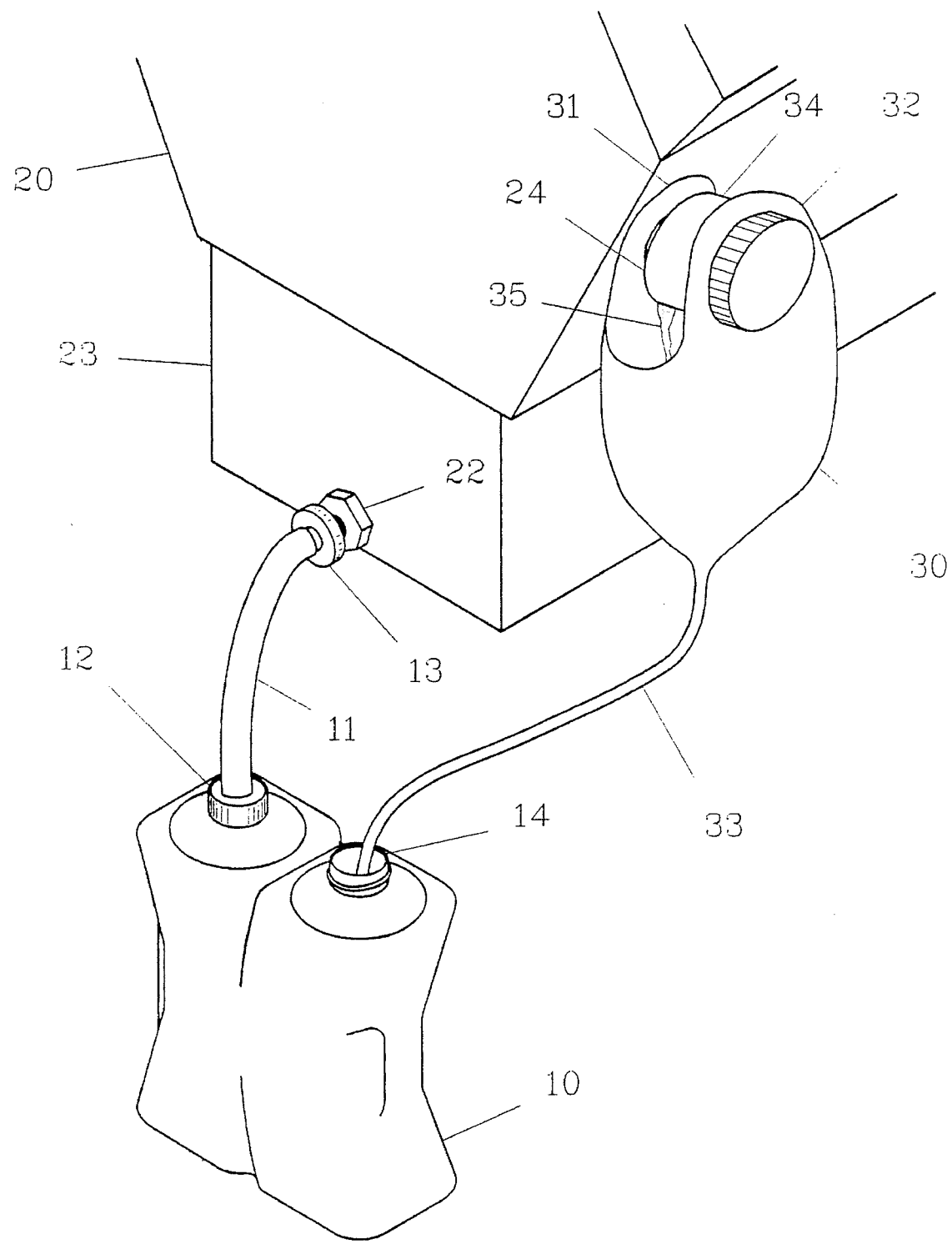
FIG. 3 is a partial view of an engine illustrating the details of the oil collection system.
Figure 4:
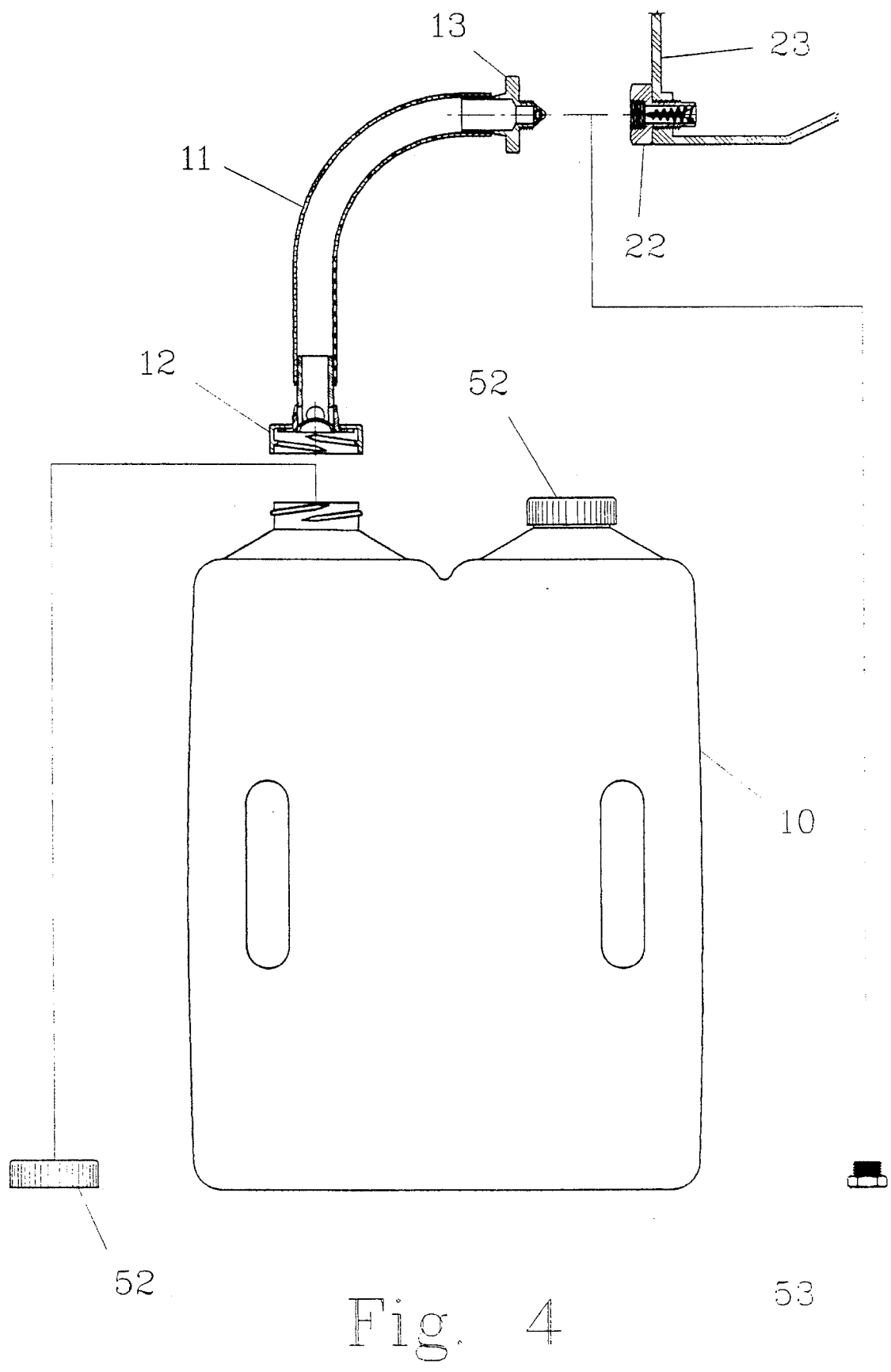
FIG. 4 is a biaxial sectional view of the transfer tube and its couplings between the supply/collection container and the oil sump drain.

The details of the collection configuration are shown in greater detail in FIGS. 3 and 4. The transfer tube 11 connection is accomplished by leak-proof connections 12 and 13 incorporated in the ends of the transfer tube. Connection 13 is an oil drain conduit which fits into a sump drain check valve/adapter 22 in the engine oil system. Connection 12 is a slip joint nut/cap fitting container which includes a flow controlling conduit valve. These fittings are illustrated in detail in FIGS. 5, 6 and 7.

The oil collection bag 30 of the oil filter drain illustrated in FIG. 3 includes a pair of stretchable openings which form handles 31 and 32 and an oil filter drip collection bag drain tube 33 which provides a conduit from the bottom of the oil collection bag to the second opening 14 of the recycling container 10. The oil collection bag 30 is placed on the engine by stretching one handle over the oil filter 34 and pushing it against the engine so that the opening between the oil filter gasket and the engine adaptation fitting is over the open collection bag 30. The collection bag is held in the open position by the second handle 32 which is fitted over the other end of the oil filter as illustrated. With the oil collection bag 30 placed as illustrated in FIG. 3, the oil filter 34 is loosened so that trapped oil 35 runs from the mounting flange/gasket area 24 into the collection bag 30.

FIG. 4 illustrates the transfer tube 11 and its two adapter fittings 12 and 13. Fitting 12 is designed to replace either of the caps 52 that provide shipping closures for the supply/recycling container 10. The leak-proof connector 13 couples to the sump drain check valve/adapter 22 in the oil pan sump 23. The check valve/adapter 22 is normally sealed by a threaded plug 53.

Figure 5:
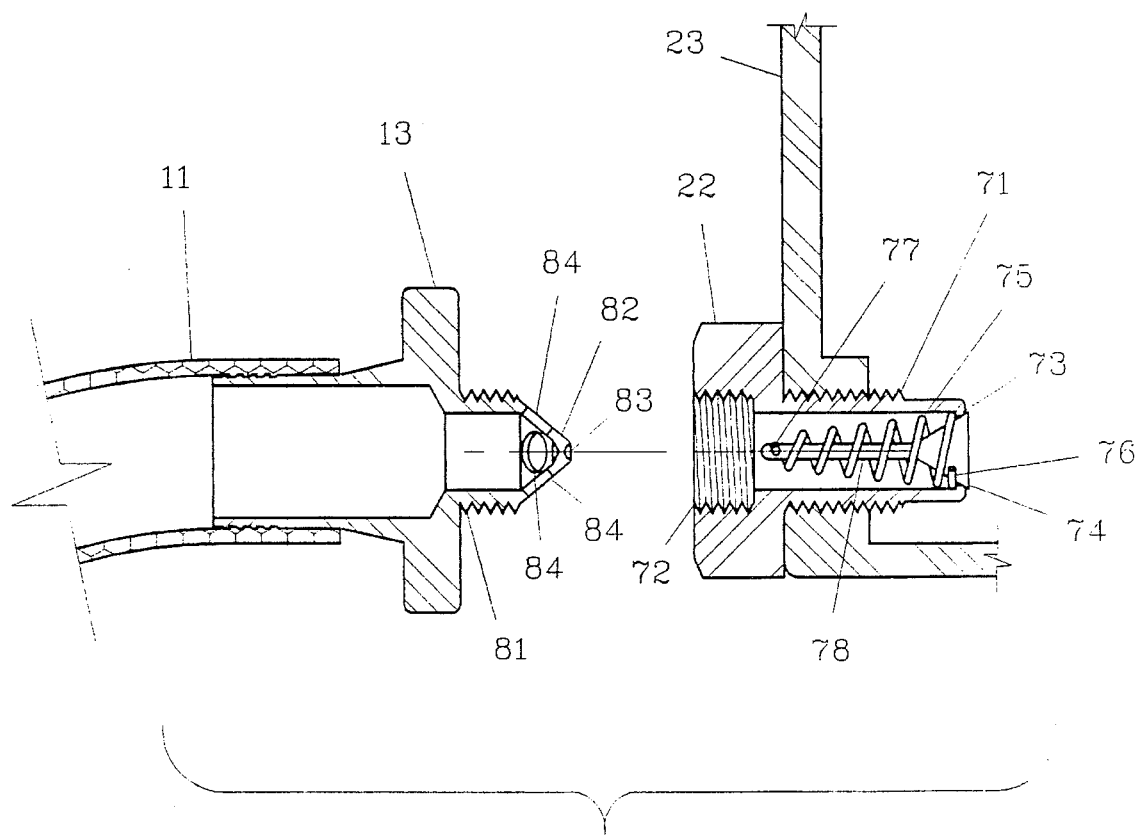
FIG. 5 is a biaxial sectional view of the oil sump drain check valve/adapter and transfer tube fitting.

The oil pan sump drain check valve/adapter 22 can be seen in greater detail in FIG. 5. It is approximately the size of a normal oil pan drain plug and includes a threaded shaft 71 which matches the standard threaded drain opening in the oil pan sump 23. It is designed to be permanently affixed to the oil pan sump in place of the normal drain plug. It includes an axially aligned bore which is threaded on the end extending outside the oil pan to receive the safety closure plug 53 of FIG. 4 during normal operation of the engine or the transfer tube valve actuator fitting 13 when spent oil is being removed.

The oil pan sump drain check valve/adapter 22 of FIG. 5 is provided with a beveled valve seat 73 which forms a reduced diameter flange around the opening of the adapter within the oil pan. This valve seat cooperates with a conical shaped sealing valve member 74 which is normally biased closed by spring 75 to form a flow controlling valve in the oil drain check valve/adapter. The spring 75 is under compression. One end, 76, of the spring rests against the flange formed by the underside of the valve seat 73. The other end, 77, is secured to the end of an extension shaft 78 of the conical sealing valve 74. In the preferred embodiment, this attachment is made by a simple bore in the end of the extension through which the end 77 of the spring passes. In operation, the spring tries to expand and thus holds the conical valve closed, preventing oil from draining from the engine oil system even when the plug 53 is removed.

The transfer tube valve actuator fitting 13 is comprised of a hollow body secured at one end to the transfer tube 11. The other end of the fitting includes a threaded portion 81 adapted to mate with the female threads 72 of the oil pan sump drain check valve/adapter 22. Threaded portion 81 of transfer tube adapter fitting 13 includes a conical termination 82 which includes a plurality of bores 84 that allow oil to pass through the fitting 13.

When the fitting 13 is screwed into the check valve/adapter 22, a recess 83 in the end of the conical termination 82 is seated against the end of the conical valve extension 78. As the fitting 13 is screwed into the adapter 22, the spring is compressed and the valve check 74 is forced open to allow oil to drain from the sump, through the fitting and into the tube without risk of leakage.

Figures 6, 7:
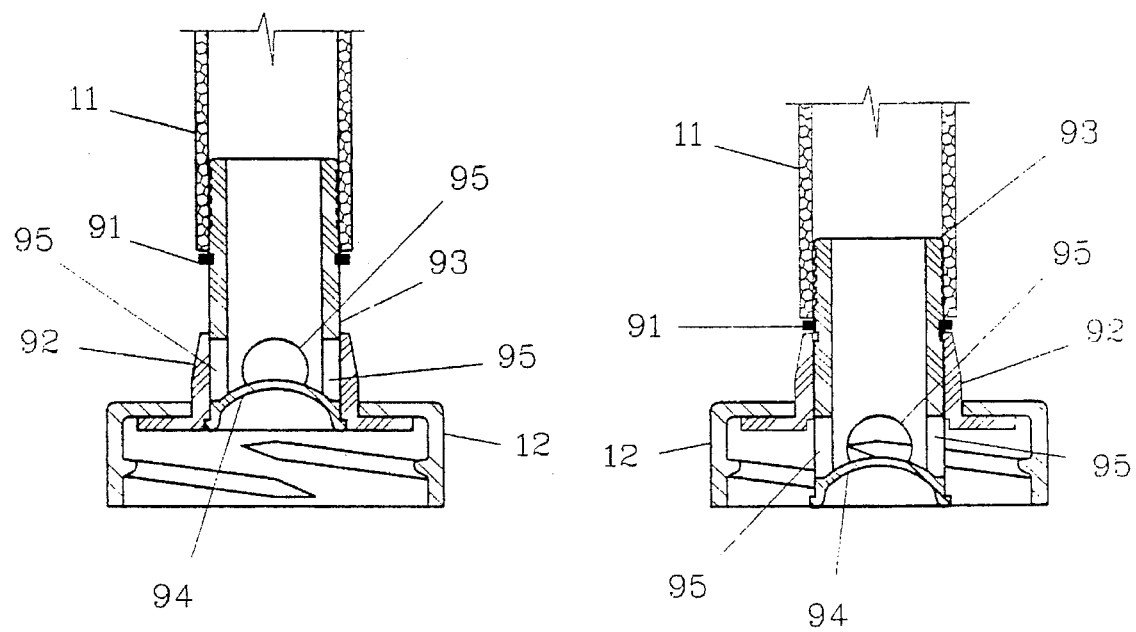
FIG. 6 is a biaxial sectional view of the container spout valve adapter in the closed configuration.
FIG. 7 is a biaxial sectional view of the container spout valve adapter in the open configuration.

The other end of transfer tube 11 is fitted with a spout valve adapter which included a sleeve 93 which is a flow controlling conduit valve. This valve is illustrated in the closed condition in FIG. 6 and the open condition in FIG. 7. It is comprised of a sleeve 93 and a bushing 92. The sleeve 93 is fitted in the bushing and dimensioned to prevent oil leakage between the bushing inner wall and sleeve but permit relative movement between the bushing and sleeve. The sleeve is comprised of an open bore closed at one end by a sealing panel such as a plug 94. The open end is sealed to the inner wall of the transfer tube 11. A plurality of holes 95 are provided in the sleeve 93 immediately above plug 94 so that when the sleeve is pulled to its upper most position as illustrated in FIG. 6, the holes 95 are closed by the bushing to seal the valve. Snap ring 91 rests in a groove on sleeve 93 and acts as a stop for conduit 11 and bushing 92. A slip joint nut 12 secures the valve to the container 10. When the sleeve is pushed into the bushing as illustrated in FIG. 7, the holes 95 communicate with the interior of the container to allow oil flowing through the tube to enter or leave the container, thus forming a flow controlling conduit valve. The conduit valve controls oil flow when the transfer tube is being used to drain fresh oil from the container into the engine or spent oil from the engine into the container.

A complete sequence of operation using the supply/recycling container 10 comprises a user connecting the transfer tube 11 to one of the openings of the container by the threaded or otherwise securable slip joint nut/cap 12. The transfer tube adapter fitting 13 is then placed in the oil fill opening of an engine which has been drained of spent oil. The engine receives fresh oil as the container is laid on its side to permit oil to flow from the container into the engine via the transfer tube 11. To facilitate the flow of oil from the container into the engine, the sealing cap 52 of the second opening of the container 10 may be loosened slightly to allow air to enter the container as oil drains through the transfer tube.

Once the fresh oil is drained from the container into the engine, the container is put aside and saved until the oil in the engine is spent. At that time, the sump drain adapter plug 53 is removed and with the transfer tube slip joint nut/cap 12 connected to the container, the transfer tube adapter fitting 13 of the transfer tube 11 is threaded into the oil drain check valve/adapter 22. The spent oil flows from the oil sump 23 into the container 10.

If the oil filter is to be changed, the oil collection bag tube 33 of the collection bag 30 is inserted into the second opening 14 of the container 10 as illustrated in FIG. 3. One handle 31 is slid over the oil filter, past the oil filter connection flange and against the engine block. The bag is held open by the other handle 32 which is slid partially over the end of the oil filter 24 so that the bag is held opened under the oil filter gasket to collect any oil that runs from that opening as the oil filter is loosened. The oil filter may be loosened while the stretch handle 32 is at the mid position of the oil filter or the filter may be loosened before the handle is slid onto the oil filter, this is a function of the tool being used to loosen the oil filter. However, in all cases, the collection bag 30 is held open either manually or by being placed on the oil filter while the oil filter is loosened. Once the oil has stopped draining from the oil filter/engine interface 24, the oil filter is removed by completely unscrewing it from the engine. During this process, the handle 32 remains on the oil filter so that as soon as the oil filter is unscrewed, the oil filter may be turned open end down into the collection bag 30 so that the oil within the filter is collected and drained via tube 33 into the container 10. This ensures that the maximum amount of oil is recycled during the collection process. At this time, a new oil filter may be placed on the engine.

When oil has stopped running from the oil sump drain check valve/adapter 22, fitting 13 is removed and the oil sump drain plug 53 is replaced. Fresh oil is added from a second supply/recycling container as illustrated in FIG. 1, using the transfer tube 11 used in prior operations.

In a preferred embodiment of the invention, the oil filter collection bag assembly 30 and transfer tube 11 and associated fittings are provided in the form of a reusable kit.

Figure 9:
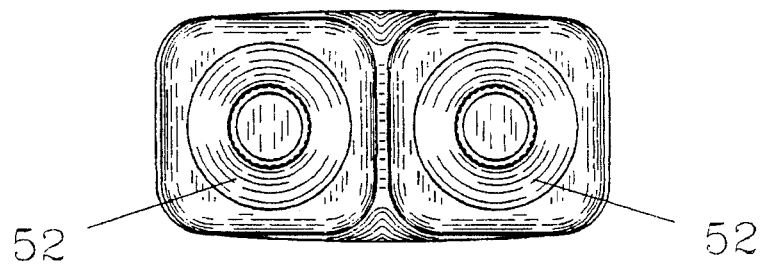
FIG. 9 is a top view of the preferred container embodiment.
Figure 8:
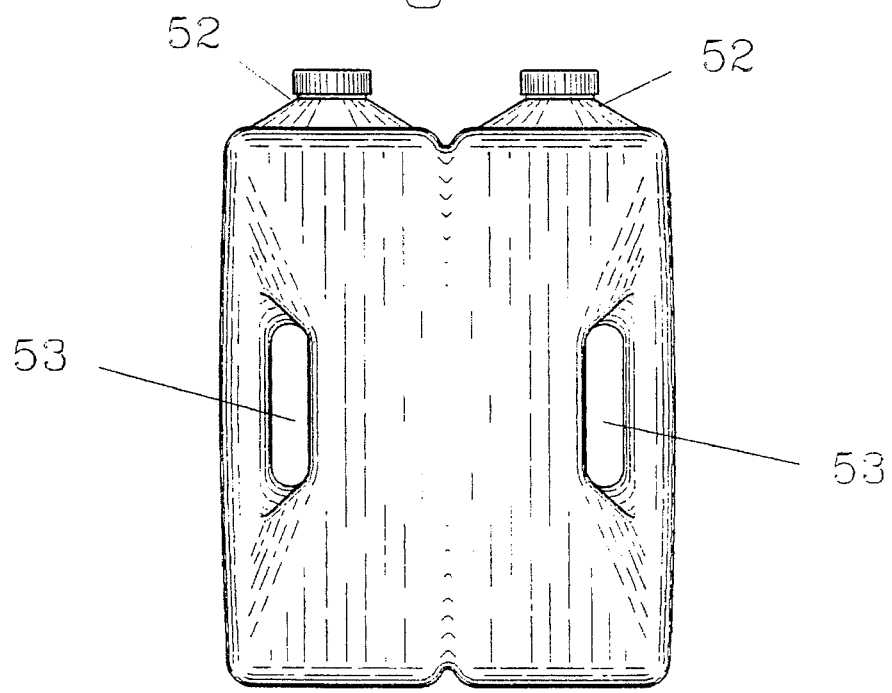
FIG. 8 is a side view of the preferred container embodiment.
Figure 10:
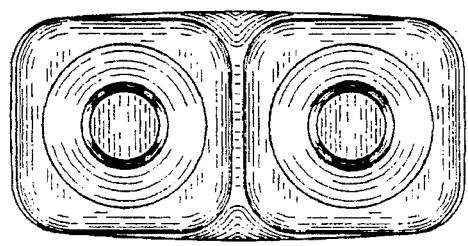
FIG. 10 is a bottom view of the preferred container embodiment.
Figure 11:
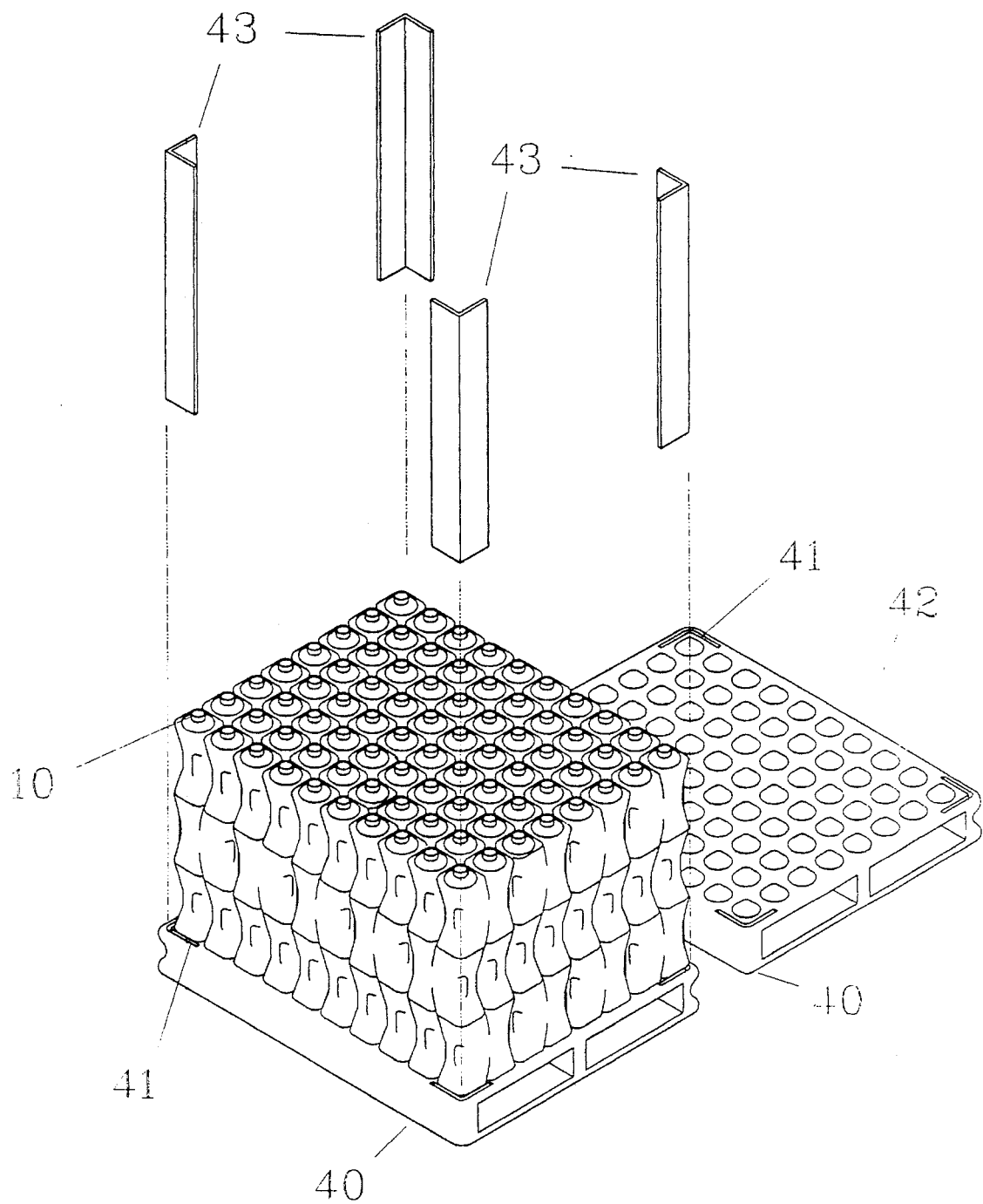
FIG. 11 illustrates a plurality of oil recycling containers stacked on a special purpose pallet.

The preferred embodiment uses supply/collection containers which are configured as illustrated in FIGS. 8 through 10. Each container is comprised of two mirror image halves which include resealable openings normally sealed by caps 52. Cutouts 53 form handles on opposite sides of the container so that it may easily be placed with either half down, see FIGS. 8 and 1. FIG. 9 illustrates the symmetry of the top of the double container and FIG. 10 depicts the recesses which are dimensioned to receive the tops of a lower container when two or more are stacked one on the other. Because each half of a container has a square cross section, plural layers of containers may be stacked for maximum packing density by orienting the containers in each layer 90 degrees to the containers in its adjacent layers. In this way, each container is interlocked to two containers in each adjacent layer to provide stack security as well as maximum packing density. The containers are stored and shipped on a pallet 40 as illustrated in FIGS. 11 and 12.

Figure 13:
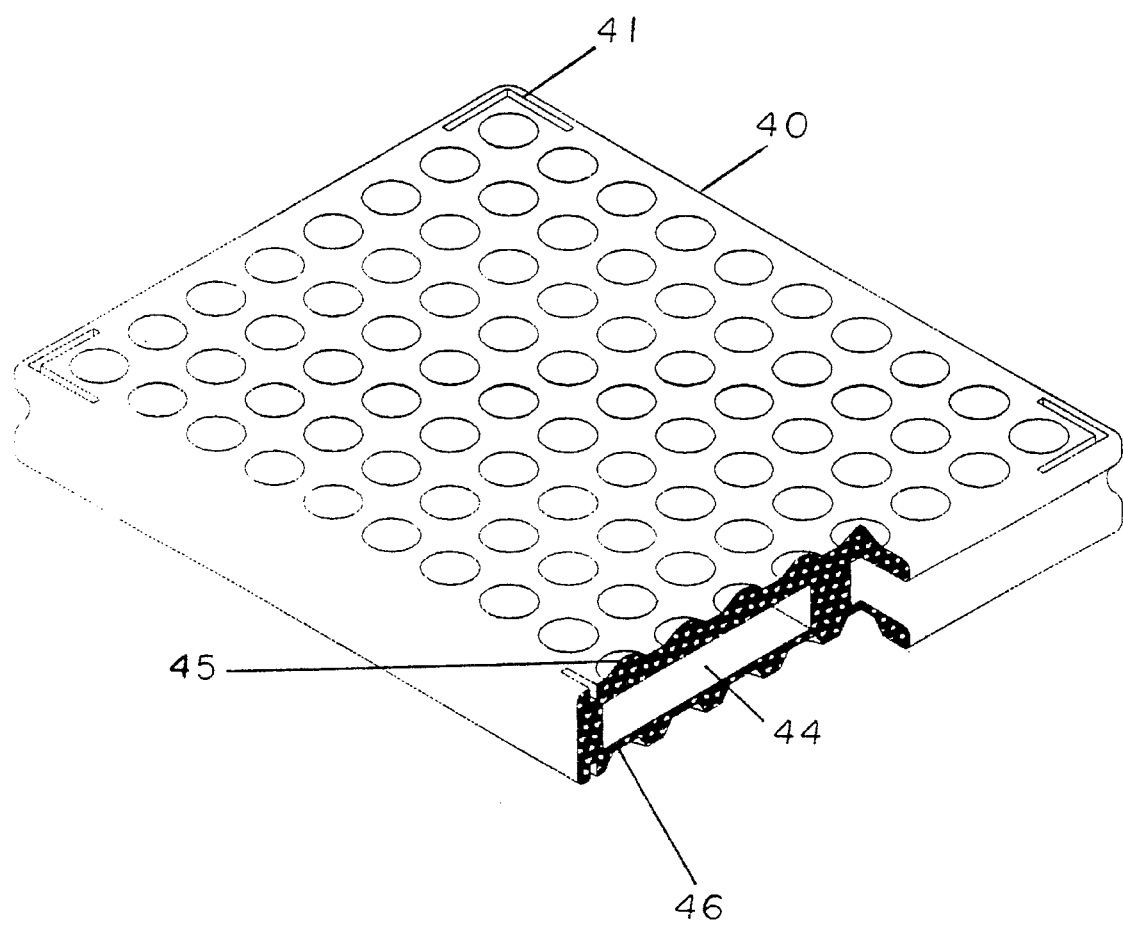
FIG. 13 is a cut-away view of a special purpose pallet.

FIG. 13 illustrates the structural details of the pallet 40. It is constructed from a rigid plastic and has a hollow core to lighten the structure without degrading its strength. Knoblike projections 45 which emulate the size and spacing of container caps are formed on the top of the pallet. The projections are arranged to create a pattern which conforms to the depressions on the bottoms of a plurality of densely packed containers as illustrated in FIG. 11.

Figure 12:
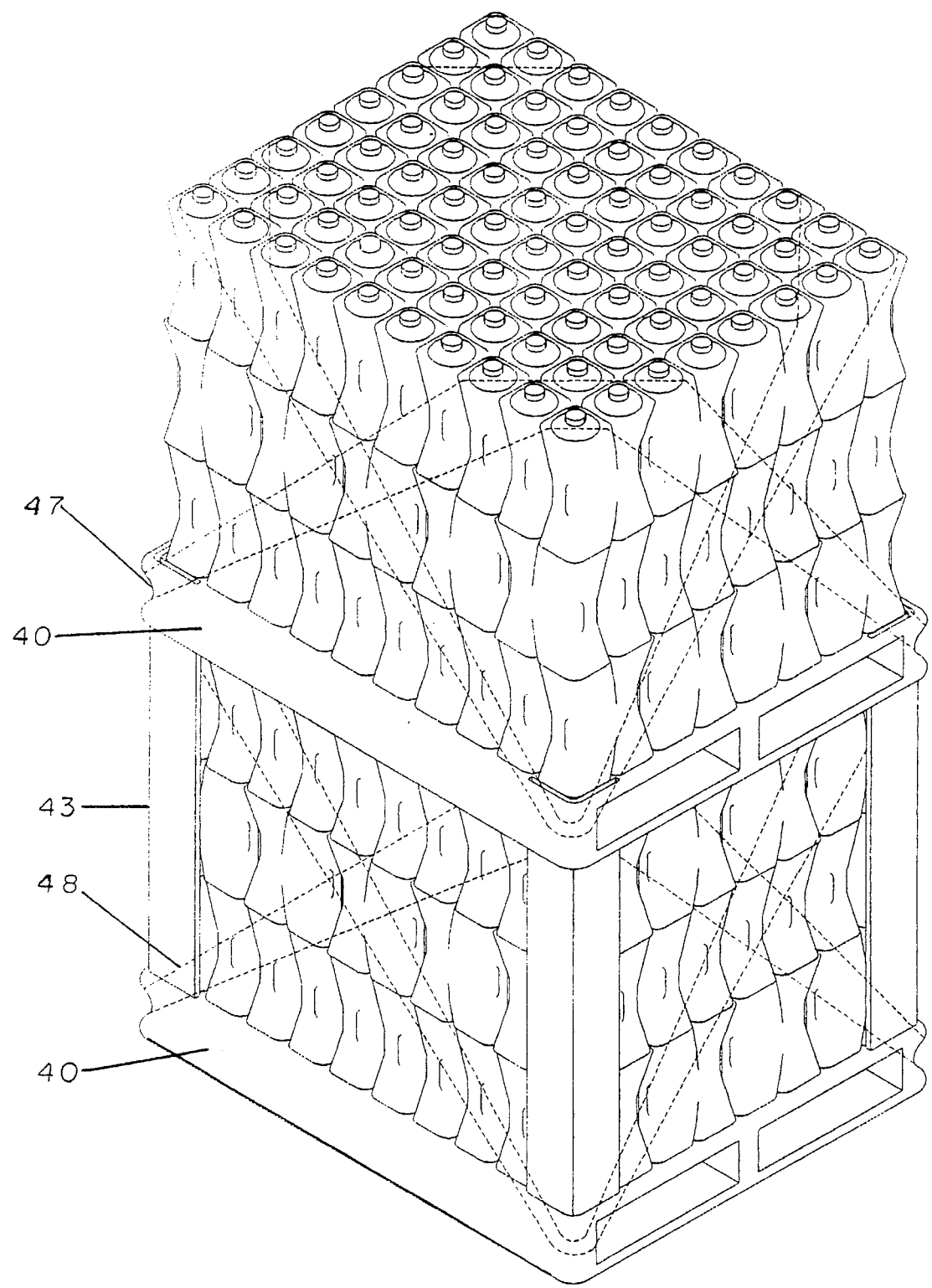
FIG. 12 illustrates a stack of loaded pellets.

The bottom of the pallet 40 includes a plurality of depressions 46 which emulate the bottoms of a plurality of densely packed containers arranged so the bottom of the pallet will lock over the tops of a plurality of containers as illustrated in FIG. 12. The bottom and top of the pallet includes right angle slots 41 at the corners to receive the ends of the load bearing angle columns 43 as illustrated in FIG. 11 where the pallet includes right angle slots 41 and a plurality of containers 10 are arranged in layers 48 where each container is positioned relative to the adjacent containers in an orientation calculated to achieve maximum packing density. Additional layers 49 of containers 10 are placed on top of the first layer with each layer interlocked to adjacent layers by the interlocking fit of the container bottoms with the container tops. A second pallet, identical to the first, with a plurality of sockets on the bottom to fit exactly over the caps of the stacked containers on the first pallet is positioned as illustrated in FIG. 12. The external corner sidewalls of the pallet are concaved as illustrated by 47 of the figures to provide a notch to hold stretch wrap, banding, rope or other securing means 48 as illustrated in FIG. 12.

When a package of oil containers containing the fresh oil and palleted as illustrated in FIG. 12 is received at a service facility, the stretch wrap 48 is removed for access by the consumer. Empty pallets are then used to receive drained containers 10 which are subsequently used to collect spent oil. Once a pallet load of containers containing spent oil has been assembled, it is stretch wrapped and corner support members 43 are used for stacking palletized assemblages of spent oil filled containers. The containers/pallets may be banded or tied for shipment to the recycling center where the oil is removed from the containers, refreshed and returned to cleaned recycled containers for resupply to service facilities.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. An oil recycling system, comprising:

a container;

a transfer tube designed for draining oil from said container into an engine and arranged for draining oil from the engine oil sump into said container;

an oil collection bag arranged for receiving oil draining from an interface between said engine and an oil filter and from said oil filter; and said oil collection bag including an oil collection bag tube arranged for draining oil collected in said bag into said container concurrently with and via a separate flow path from oil draining from said engine oil sump via said transfer tube into said container.

2. An apparatus as defined in claim 1 wherein said transfer tube includes:

a flow controlling conduit connecting said container to a first end of said transfer tube;

an oil drain adapter fitting attached to said engine oil sump;

a flow controlling valve incorporated in said oil drain adapter fitting;

an oil drain conduit incorporated in a second end of said transfer tube; and said oil drain conduit including means for completing a fluid transfer coupling between said oil drain and said transfer tube and a means for opening said flow controlling valve in response to the connection of said oil drain conduit to said oil drain.

3. An apparatus as defined in claim 1 wherein said oil collection bag includes a first opening handle dimensioned to slide over said oil filter and an oil filter connection flange of said engine for positioning said collection bag under the interface between said oil filter and said engine; and a second handle dimensioned to fit over said oil filter and hold said bag in an open position to receive oil draining from said interface when said oil filter is loosened.

4. An apparatus as defined in claim 1 wherein said container includes a first opening to receive said transfer tube; and a second opening for receiving said oil collection bag tube.

5. An oil recycling system as defined by claim 1, wherein said container includes two resealable openings.

6. An oil recycling system as defined by claim 5, comprising:

a plurality of said containers;

a bottom pallet configured to hold a portion of said plurality of said containers in a first layer relatively positioned for optimum packing density;

each of said containers including a bottom configured to permit interlocking stacking of additional layers of said plurality of said containers relatively positioned for optimum packing density;

a top pallet configured identically to said bottom pallet and to interlock the uppermost layer of said layers of said containers.

7. An oil recycling system as defined by claim 6, comprising:

a plurality of corner load bearing members connecting said bottom pallet to said top pallet.

8. An oil recycling system, comprising:

a container including first and second openings;

a transfer tube designed for draining oil from said container first opening into an engine and arranged for draining oil from the engine oil sump into said container;

an oil collection bag arranged for receiving oil draining from an interface between said engine and an oil filter and from said oil filter;

said oil collection bag including a first handle dimensioned to slide over said oil filter and an oil filter connection flange of said engine for positioning said collection bag under the interface between said oil filter and said engine and a second handle dimensioned to fit over said oil filter and hold said bag in an open position to receive oil draining from said interface when said oil filter is loosened;

said oil collection bag including an oil collection bag tube arranged for draining oil collected in said bag into said container via said container second opening concurrently with oil draining from said engine via said transfer tube into said container via said container first opening;

a flow controlling conduit connecting said container first opening to a first end of said transfer tube;

an oil drain adapter fitting attached to said engine oil sump;

a flow controlling valve incorporated in said oil drain adapter;

an oil drain conduit incorporated in a second end of said transfer tube;

said oil drain conduit including means for completing a fluid transfer coupling between said oil drain adapter fitting and said transfer tube and a means for opening said flow controlling valve in response to connection of said oil drain conduit to said oil drain adapter fitting.

9. An oil recycling system as defined by claim 8, comprising:

a plurality of said containers;

first and second identical pallets including a plurality of knobs on one side to hold a portion of said plurality of said containers in a first layer relatively positioned for optimum packing density and on the reverse side to receive each of said containers including a bottom configured to permit interlocking stacking on said pallets and additional layers of said plurality of said containers relatively positioned for optimum packing density.

10. An oil recycling system as defined by claim 9, comprising:

a plurality of corner load bearing members for support for stacking additional successive pallets.

11. A method for recycling engine oil, including the steps of:

placing one end of a transfer tube relative to a collection container so that oil from said transfer tube will run into said collection container;

connecting the other end of said transfer tube to an oil sump drain adapter on said engine oil sump;

opening a flow controlling valve in said oil sump drain adapter by said step of connecting the other end of said transfer tube to the oil sump drain adapter of said engine oil sump;

supporting an oil collection bag under an interface of an oil filter with said engine;

placing the end of a drain tube for said oil collection bag relative to the collection container so that oil will run into said collection container; and loosening said oil filter until oil runs from said oil filter engine interface into said oil collection bag.

12. A method for recycling engine oil as defined by claim 11 wherein said steps of placing one end of a transfer tube relative to a collection container so that oil from said transfer tube will run into said collection container and placing the end of a drain tube for said oil collection bag relative to the collection container so that oil will run into said collection container are accomplished concurrently.

13. A method for recycling engine oil as defined by claim 12 including the step of opening a valve to permit oil to flow from said drain tube into said container after said step of connecting the other end of said drain tube to the oil sump drain adapter of said engine.

14. A method for recycling engine oil as defined by claim 12, including the steps of:

removing the stretch wrap from a plurality of collection containers of the type which include two resealable openings, said collection containers arranged in a plurality of layers wherein each layer consists of a plurality of said collection containers containing fresh oil and the bottom layer of said plurality of layers are secured in position on a pallet by the configuration of said pallet;

removing one of said fresh oil containing collection containers from the topmost of said layers;

opening one of said resealable openings of said removed fresh oil containing collection container;

connecting an oil transfer tube to said opened resealable opening;

positioning said removed fresh oil containing collection container above the oil fill opening of an engine which has been prepared to receive fresh oil;

positioning the unconnected end of said oil transfer tube into said oil fill opening;

opening a flow control means to allow fresh oil to flow from said removed collection container into said engine; and after said fresh oil has been drained from said removed collection container, collecting spent oil in said removed collection container and storing it on said pallet.

* * * * *